(12) United States Patent  (10) Patent No.: US 8,068,135 B2
Kim  (45) Date of Patent: Nov. 29, 2011

(54) DEVICE AND METHOD FOR DETECTION AND PREVENTION OF MOTOR VEHICLE ACCIDENTS

(76) Inventor: Chol Kim, Riverside, CA (US)

( * ) Notice: Subject to any disclaimer, the term of this patent is extended or adjusted under 35 U.S.C. 154(b) by 1030 days.

(21) Appl. No.: 11/998,595

(22) Filed: Nov. 29, 2007

(65) Prior Publication Data

US 2009/0009603 A1    Jan. 8, 2009

Related U.S. Application Data

(60) Provisional application No. 60/958,599, filed on Jul. 6, 2007.

(51) Int. Cl.
*H04N 7/18* (2006.01)

(52) U.S. Cl. ........................................................ 348/148

(58) Field of Classification Search .......... 348/140–149; 707/913–914
See application file for complete search history.

(56) References Cited

U.S. PATENT DOCUMENTS

| | | | |
|---|---|---|---|
| 4,833,469 A | 5/1989 | David | |
| 6,056,374 A | 5/2000 | Hiwatashi | |
| 6,114,951 A | 9/2000 | Kinoshita et al. | |
| 6,223,125 B1 * | 4/2001 | Hall | 701/301 |
| 6,272,418 B1 | 8/2001 | Shinmura et al. | |
| 6,427,111 B1 | 7/2002 | Dieckmann | |
| 6,488,109 B1 | 12/2002 | Igaki et al. | |
| 6,546,327 B2 | 4/2003 | Hattori et al. | |
| 6,553,130 B1 | 4/2003 | Lemelson et al. | |
| 6,622,076 B1 | 9/2003 | Nakai et al. | |
| 6,847,894 B1 | 1/2005 | Hasegawa | |
| 6,873,286 B2 | 3/2005 | Albero et al. | |
| 6,896,396 B2 | 5/2005 | Yagi | |
| 6,941,211 B1 | 9/2005 | Kuroda et al. | |
| RE38,870 E * | 11/2005 | Hall | 701/301 |
| 2002/0082777 A1 | 6/2002 | Halsted et al. | |
| 2002/0198632 A1 * | 12/2002 | Breed et al. | 701/1 |
| 2003/0227378 A1 | 12/2003 | Nakai et al. | |
| 2004/0135992 A1 | 7/2004 | Munro | |
| 2005/0278098 A1 | 12/2005 | Breed | |
| 2006/0095207 A1 | 5/2006 | Reid | |

* cited by examiner

*Primary Examiner* — Joseph Avellino
*Assistant Examiner* — Mark O Afolabi
(74) *Attorney, Agent, or Firm* — Donn K Harms

(57) ABSTRACT

A device and method for vehicle collision avoidance and mitigation employing a video camera providing a frontal view of a roadway to a video display. A plurality of generally trapezoidal windows formed in front of and rearward of an iconic vehicle are employed to ascertain objects in front of and rearward of the vehicle. Using software, a closing rate of any object is continually calculated, and warnings or evasive actions are taken if a collision is calculated. The device can differentiate between shadows and objects through a filtering method requiring pixel changes in two or more windows concurrently for an object to be determined.

14 Claims, 15 Drawing Sheets

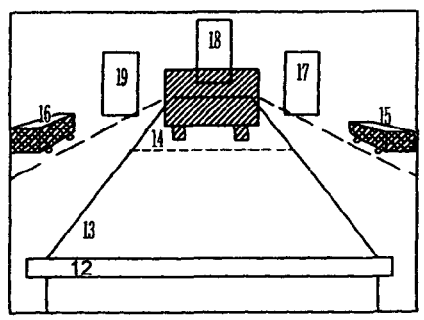
Fig. 15
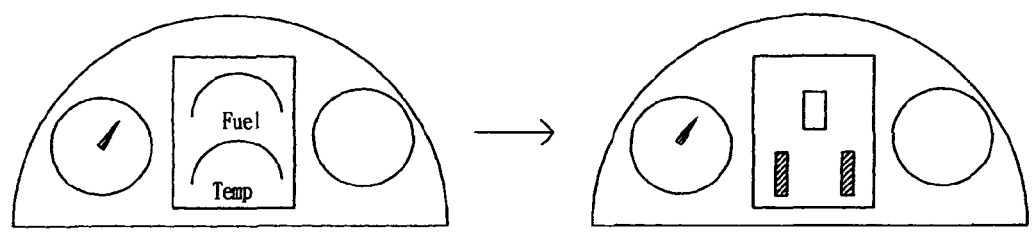
Fig. 15a → Fig. 15b

DEVICE AND METHOD FOR DETECTION AND PREVENTION OF MOTOR VEHICLE ACCIDENTS

This application claims the benefit of U.S. Provisional Application No. 60/958,599 filed on Jul. 6, 2007, and incorporated herein in its entirety by reference. The disclosed system and method relate generally to motor vehicle safety. More particularly, the disclosed device relates to a simply deployed video-based collision warning and prevention system providing for accident avoidance, collision avoidance, blind spot detection and anticipatory sensing of potential hazards for drivers of motor vehicles operating on highways.

FIELD OF THE INVENTION

Background of the Invention

Since the first automobiles were operated on highways, the potential for accidents has been an ever-increasing hazard. With ever more vehicles operating on the highways, at higher speeds, the potential for collisions increases accordingly. Further, with modern conveniences such as cellular phones, PDA's and other driver-attention impeding devices being used by drivers concurrently operating the vehicle, the risk of collisions is even greater.

As a consequence of increasing traffic and decreasing driver attention, automobile accidents are one of the most serious problems facing most modern countries. Deaths and injuries caused by vehicle collisions can produce both emotional and extreme financial losses. The costs for medical treatment and ongoing care for permanent injuries to accident victims are an ever increasing problem. When the resulting loss of employment opportunities and financial losses resulting from damage to property are combined with the physical injuries, the combined losses in most countries having vehicles can be staggering. As a consequence, there is a constant need to provide improved devices and methods to help eliminate the deaths, injuries, and financial losses that are continually caused by vehicle collisions and accidents.

Futuristic solutions are in the planning stages in many countries for Intelligent Vehicle Highway Systems, the goal of which is traffic and accident reduction. However, most such systems are still only being planned or designed, and it will be decades before all vehicles are controlled by a computer or other accident avoidance system when on the highway.

Laser and radar-based systems have been designed and deployed in a limited number of vehicles. However, both such systems are very expensive and limited to a small portion of luxury vehicles which operate on today's roads. Further, laser-based systems do not perform well in the rain or fog, and radar-based systems are subject to interference from localized broadcasting on the same frequency, and to limitations on their own function by limitations on their broadcasting power.

As such, there exists an unmet need for a reasonably inexpensive and easy-to-deploy accident and collision avoidance system. Such a system should be easy to deploy in a wide variety of vehicles be they luxury or inexpensive. Such a system should be easy for drivers to use no matter their education level or mechanical or computer ability. Such a system should best employ off-the-shelf components in a manner that yields excellent collision avoidance through accurate warnings of collision potential to the driver. Such a system using such off-the-shelf components should be able to ascertain the difference between a shadow from a tree or cloud appearing on the screen and an actual vehicle or a physical threat which may appear on the screen. Still further, such a system should be able to take evasive action on its own, irrespective of the driver's attention to warnings, to stop the vehicle short of an accident or deploy safety devices from the vehicle to minimize injuries and damage.

SUMMARY OF THE INVENTION

The device and method as herein disclosed and described provides a collision warning and avoidance system which is readily deployable using off-the-shelf components. It is thus inexpensive to implement and can be deployed in a wide variety of vehicles be they economy or luxury class vehicles. Even though inexpensive and simple to operate, the system based on self-determined threats can issue warnings, operate the brakes or deploy protective equipment on the vehicle in response to the perceived threat.

The system and method employ a pair of video cameras trained in front of and to the rear of the vehicle, and a computer using a novel graphic interface interacting with the displayed pixels in defined areas of the video display from the cameras. The system identifies certain areas of pixels on the screen in individually defined windows which occupy specific positions relative to each other. Using this system of strategically placed windows on the screen, false alarms such as shadows which constantly fool conventional systems are easily determined and ignored, and threat levels to the car and driver are calculated and warnings can be initiated to take evasive action, depending on the nature and imminence of a pending threat of a collision.

The system employs a forward facing video camera which is trained upon the road in front of the driver at all times. This front camera will produce a video feed of the road and horizon in front of the driver for display on a video screen, or in a virtual video screen inside the computer. As is the case with such video displays, a graphics card interprets the feed from the video camera and translates it into individual pixels for display on the video screen forming horizontal and vertical lines. For instance, many LCD type displays employ between 380 to 720 lines, with 480 horizontal lines formed of individual pixels being a popular version. Each pixel on the screen, since it must change color according to the view communicated from the camera, has a known location to the computer. A similar configuration is employed with cathode ray tubes.

Overlain by the computer, on the video screen projection of the road in front of the vehicle communicated from the camera, are a plurality of individual windows defining areas of pixels in determined locations. Each of these windows is of varying dimensions and are located at specific locations on the screen to ascertain a threat or false alarm depending on combinations with the information from other windows.

The current preferred number of such individual windows defined in the specific locations on the screen is ten in the forward direction and eight in the rearward direction displayed by the rear facing video camera. These windows have a static dimension and each has a static location on the video screen relative to the road depiction from the camera, allowing software to monitor the display communicated by the pixels in each window. As noted, this monitoring is provided because the individual pixels inside each such window and their location on the x-y axis of the display screen are known to the computer using any of a number of graphical interfaces adaptable to the task.

Each camera, in order to properly display the video feed to the video display, to thereby position the defined windows in the proper place, must be initially calibrated. This calibration is achieved by moving the camera on its mount to position a displayed boundary line on the video screen between two of the inline windows at a specific point on the screen. Software on the computer will calculate actions, determine threats, and ascertain false alarms, based on measurements from this point on the screen and other factors. Once so calibrated, all of the windows of the overlay will be properly positioned.

In the forward display, there are overlain ten individual windows of specific dimensions. At the top of the screen, aligned with the center of the display, is window 1 which is a bar centrally located in a row of five such bars. This bar is placed along the center of a vertical axis of the display screen.

Adjacent to window 1 are windows 2 and 3 which are parallel to and on each side of window 1, and slightly longer. To the outside of windows 2 and 3, are windows 4 and 5 respectively, forming a row of parallel bar-shaped windows declining in length from the longest windows 4 and 5 at the outside, to the shortest bar at the center which is window 1. Window 1 has a center axis substantially aligned with the center of the vehicle and the view of the front camera.

A second series of trapezoidal windows are overlain in adjacent positions in front of the vehicle which is also displayed centrally on the display screen. These trapezoidal windows grow from the narrowest window number 6, to the widest window number 8 which is broken into two sections. A rectangular window number 9 is located immediately in front of the hood of the vehicle which may or may not be depicted on the video screen as an iconic vehicle representation. The area of window number 9 occupies the area in-between the front edge of the vehicle, and window number 8. From an operational standpoint, depiction of the vehicle itself is not necessary and may be preferable to allow for a smaller screen.

One additional window number 11 is depicted on the front view on the display which is rectangular and has an angled position relative to the inline and parallel windows from 1-10. Window number 11 is depicted in a position on the screen representative to being in a lane for oncoming traffic.

If a rearward view is provided in addition to the forward view, a second set of windows is graphically overlain on the display to the rear of the icon representing the vehicle. The rear set of windows includes two inline trapezoidal windows 13 and 14 and a small rectangular window number 12 sandwiched between window 13 and the vehicle icon.

Also in the second set of windows are three bar-shaped windows 17, 18, and 19, each having a center axis parallel to each other and parallel with the center axis of the inline trapezoidal windows 13 and 14. The center axis of window 18 is inline with the center axis running through windows 13 and 14 and the center axis running through windows 6-9 at the front of the vehicle icon.

Two angled rectangular windows 15 and 16, are positioned adjacent to the trapezoidal windows 13-14.

The view on the video display, thus, is of an iconic vehicle, having the static first set of windows to the front and second set of windows to rear of the icon representing the vehicle.

As noted, prior to use, the system is calibrated to provide the software and compute a common position distanced from the vehicle, upon which all the other windows in the system relate. This allows for calculations of speed, closing rate, and other calculations during operation of the system since movement of the depicted graphics on the screen is relative to actual speeds of the vehicle and approaching objects.

In this calibration step, currently the user or factory would adjust the camera angle looking forward, to position the boundary between adjoining windows 6 and 7, to place it at substantially 45 feet in front of the boundary for the front of the icon representing the vehicle. This will also position the boundary line approximately ⅔ to ⅘th the distance of the screen from the bottom edge. Or, using software, the size and position of the windows could also be adjusted to properly position the boundary line of 6 and 7 to a correct position. However, the physical adjustment is preferred since it provides the most accurate placement of the line at the proper distance and since electronics depictions can vary but the human eye can easily ascertain the line position relative to the point in front of the vehicle ascertained to be the proper distance.

Once so calibrated, all the windows depicted on the video display, using software in an engaged computer, being static in position relative to the movement of the pixels when the car is moving, are employed to calculate false alarms such as shadows, threat levels, warnings, and evasive actions, based on a real time constant review of the status of the movement and color of pixels inside each respective window in relation to the pixels in other windows and outside the windows.

Of course those skilled in the art will realize that other positioning schemes may yield the same means to calculate threat levels and evasive actions based on pixel changes, and any such layout of windows to depict pixel boundaries to initiate an action as would occur to those skilled in the art, to yield such a threat assessment and evasive action, are considered within the scope of this invention.

In use, once the video screen and depicted windows are properly calibrated, as the vehicle moves the pixels inside each window also move and change color and contrast as new objects come into view of the camera and the vehicle speeds up or slows down. It is this change and the interrelation of change in pairs of windows which allows for the computer to ascertain either a simple shadow or false alarm, or a threat to the vehicle, and to warn or take a calculated counter measure such as deploying the brakes, or a collision dampening system to protect occupants.

To the forward view, the computer will ascertain a location of another vehicle on the road by calculating pixel changes inside pairs or pluralities of the windows. When moving in a straight line forward, pixels showing an object in an upper window will inherently move to a lower window at a speed relative to the movement of the vehicle. The silhouette of the rear of a vehicle positioned within both windows 1 and 6, is seen by the software as a vehicle traveling in front of the user's vehicle and at a safe distance. However, a darkened or color-changed portion of pixels which does not fall into both windows will not be seen as an object and will be filtered by the software and ignored. This filtering using a two window requirement provides a means to eliminate false alarms due to shadows.

A vehicle outline or silhouette which fills any portion of window 2 or 3 in combination with window 7, will be seen as a vehicle that is much closer to the user's vehicle. In a third recognition action, a vehicle perimeter outline depicted by pixels inside one of windows 4 or 5 in combination with window 8, is interpreted as a vehicle that is very close to the user's vehicle. This is because windows 4 and 5 are longer and have a lower edge closer to the vehicle and window 8 has a leading edge very close to the vehicle.

Of particular importance in the disclosed system is the fact that in conventional systems a video display, and the computer reading it, will generally interpret a shadow from a tree, or a parked truck or a building as an object, or in this case the silhouette of a vehicle if the shadow shades one of the windows. It is here that the novel employment of the device herein is illustrated. Instead of rendering a false alarm to the computer and user when a shadow crosses on a window as in previous devices, the disclosed device herein requires that pixels must activate specific pairs of windows to determine that a solid object is in view. This alleviates the problem of tree and building shadows emulating vehicles and solid objects from which current technology suffers.

The disclosed system employs a failsafe against such filtering means to prevent such false alarms in that to be interpreted as a vehicle or other solid object by the computer software from pixel illumination state information communicated from the windows, or using a hard wired switching and filtering system to achieve the same result, two different windows must be sensed to have a pixel-activated area. The bar-shaped windows in a vertical parallel configuration 1-5, provide this filtering of data, since a car or other solid object will have height as well as width and will shade or otherwise pixilate both window 6 and window 1 to be interpreted as a vehicle or FIG. 7 and either FIG. 2 or 3. A shadow however, lacks height and when a shadow appears in FIG. 7 it will not shade the other FIG. 2 or 3. Thus shadows will always be ignored as will potential false alarms and actions by the computer and software.

Whether the computer in the user's vehicle initiates any protective action is dependent on a threat assessment. This assessment will take into consideration the relative location of the vehicle or vehicles ascertained by the system in the windows, and the closing rate between the user's vehicle and the sensed vehicle or vehicles, from the pixel changes and movement in and between the respective windows.

For instance a vehicle sensed in windows 1 and 6 will be seen as at least 45 feet from the user's vehicle and as long as the relative speeds of both stay the same, the computer and software calculating closing speeds will ascertain there is no threat. However, if the vehicle sensed in windows 1 and 6, traverses into either windows 2 or 3 combined with window 7, a new closing rate will be calculated to ascertain if a danger exists of a collision. This may cause the computer to tap the user's brakes or to issue a visual or sonic warning of upcoming vehicle.

Should the vehicle sensed by the computer in windows 2 or 3 combined with window 7, enter into either windows 4 or 5 combined with window 8, the computer will ascertain that the user's vehicle is closing in on the ascertained vehicle or object, and will either hit the brakes, release the throttle, or warn the driver, or all three evasive actions depending on the calculated closing rate.

Means to ascertain a closing rate can be calculated by using the known distance of the boundary line between windows 6 and 7, and the time it takes for the pixels representing the targeted vehicle in the windows to move across the horizontal lines of the video display, combined with the known speed of the user's vehicle. Using a derivative of the Distance=rate multiplied by time, and the time it takes for the targeted vehicle to cross various sequential horizontal lines of known distance of display pixels, the closing rate can be easily calculated. In the event that a closing rate is calculated as dangerous, the computer may seize control of the vehicle.

Further, in a particularly preferred mode of the device, counter measures can be mounted on the vehicle which may be activated individually or in combination as a means to dampen a collision. Should the computer sense that a collision is unavoidable, either from the front or the rear of the user's vehicle, one or more of these collision dampening devices would be deployed.

A first such device would be airbags engaged to the front or rear of the user's vehicle, at approximately bumper height. In fact, the airbags could take the shape of a bumper and operate as such when not deployed. Should an unavoidable impact be calculated, just prior to the impact, the airbags would deploy on the front or rear of the vehicle in the direction of the oncoming threat. These airbags would operate much like airbags inside cars where an electrical charge initiates a chemical reaction to inflate the bag. Of course the exterior airbags would be of reinforced vinyl or neoprene or another material adapted to outdoor use and higher force of vehicle impacts.

In another impact dampening action, the front and rear of the vehicle and the impacting vehicle would be equipped with an electromagnetic generation device such as an electro magnet. In this mode of dampening impact, the controlling vehicle which is the vehicle with the system determining a collision threat, would broadcast to the other vehicle a command to activate an electro magnet to yield a north or south EMF field. The controlling vehicle would concurrently activate its own electro magnetic bumper with the opposite polarity field. The result being that the two vehicles as they approach will have their impact dampened or even avoided by the two counter acting magnetic fields of their respective bumpers.

Of course other means to mitigate or dampen the forces of an impact can be deployed by the computer depending on how the vehicles are equipped and how they communicate. In cases where both the vehicles have systems, if no communication is ascertained by the control vehicle, then the airbag bumpers would deploy.

The rear view camera and video display works in essentially the same fashion as that as the front view. However, from the rear the computer will be monitoring the pixels in the windows to ascertain if an approaching vehicle is causing a dangerous situation. Since the user would have little control over a rear impact, should the computer sense that such is unavoidable, impact mitigation actions would be taken much like that of the front view. Also, in a reverse action, the computer could release the brakes slightly or in increments to allow the brake system to use some of the force of the impact to do work and thereby dampen the force on the occupants.

Since the system is employing real time video and knows the relative locations of objects in front and to the rear, it can also be employed to provide other functions.

As raindrops have a particular video signature, the appearance of raindrops in the video display can cause the computer to activate the wipers on a rainy day.

Because the relative distances of the windows and objects ascertained within them is known, the system can function as an adaptive cruise control to maintain the vehicle in front at a determined distance. This will allow the monitoring vehicle using the system to maintain a distance behind a lead vehicle and slow down or speed up to maintain that distance based on the video feed. Since shadows are ignored, the computer and system are not easily fooled into changing speeds.

As the location of oncoming cars is also ascertainable on a constant basis, as is the light of day, when night arrives and headlights are employed, the system can act to automatically dim the headlights if an oncoming vehicle is ascertained as approaching.

Finally, as the system constantly monitors front and rear positions of other vehicles, it can be employed to give the driver a graphic depiction of the vehicles to the rear and side and front of the car occupied by the user. In this fashion, cars to the right or left will be displayed as icons on the video display allowing the driver to ascertain their presence before a lane change.

It is thus an object of this invention to provide a real time road condition monitoring system for a user's vehicle that constantly calculates threats of collision employing real time video of the road combined with a video interface with windows defining pixel areas for threat assessment.

It is a further object of this invention to provide such a road monitoring system which will warn the user of an imminent danger.

It is a further object of this invention to provide such a road monitoring system which will take evasive action to minimize or avoid a collision.

It is an additional object of this invention to provide a video road monitoring system that can ascertain a one-dimensional shadow from a solid object and thereby provide means to avoid false alarms.

Yet another object of this invention is the deployment of onboard impact dampening components such as air bags or a magnetic bumper system if a collision is calculated.

It is a further object of this invention to provide the user with a video display of vehicles around the user by placing icons on the video display to better orient the driver to surroundings before lane changes.

With respect to the above description and background, before explaining at least one preferred embodiment of the invention in detail, it is to be understood that the invention is not limited in its application to the details of construction and to the arrangement of the components and/or steps set forth in the following description or illustrated in the drawings. The various apparatus and methods of the invention herein described and disclosed are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other devices, methods and systems for carrying out the several purposes of the present disclosed device yielding the system and method herein for detection and prevention of motor vehicle collisions. It is important, therefore, that the objects and claims be regarded as including such equivalent construction and methodology, insofar as they do not depart from the spirit and scope of the present invention.

BRIEF DESCRIPTION OF DRAWINGS

FIG. 15-15b shows the system as employed to objects in adjacent vehicle lanes to ascertain and signal if a lane change is advisable.

DETAILED DESCRIPTION OF PREFERRED EMBODIMENTS

Figure 1:
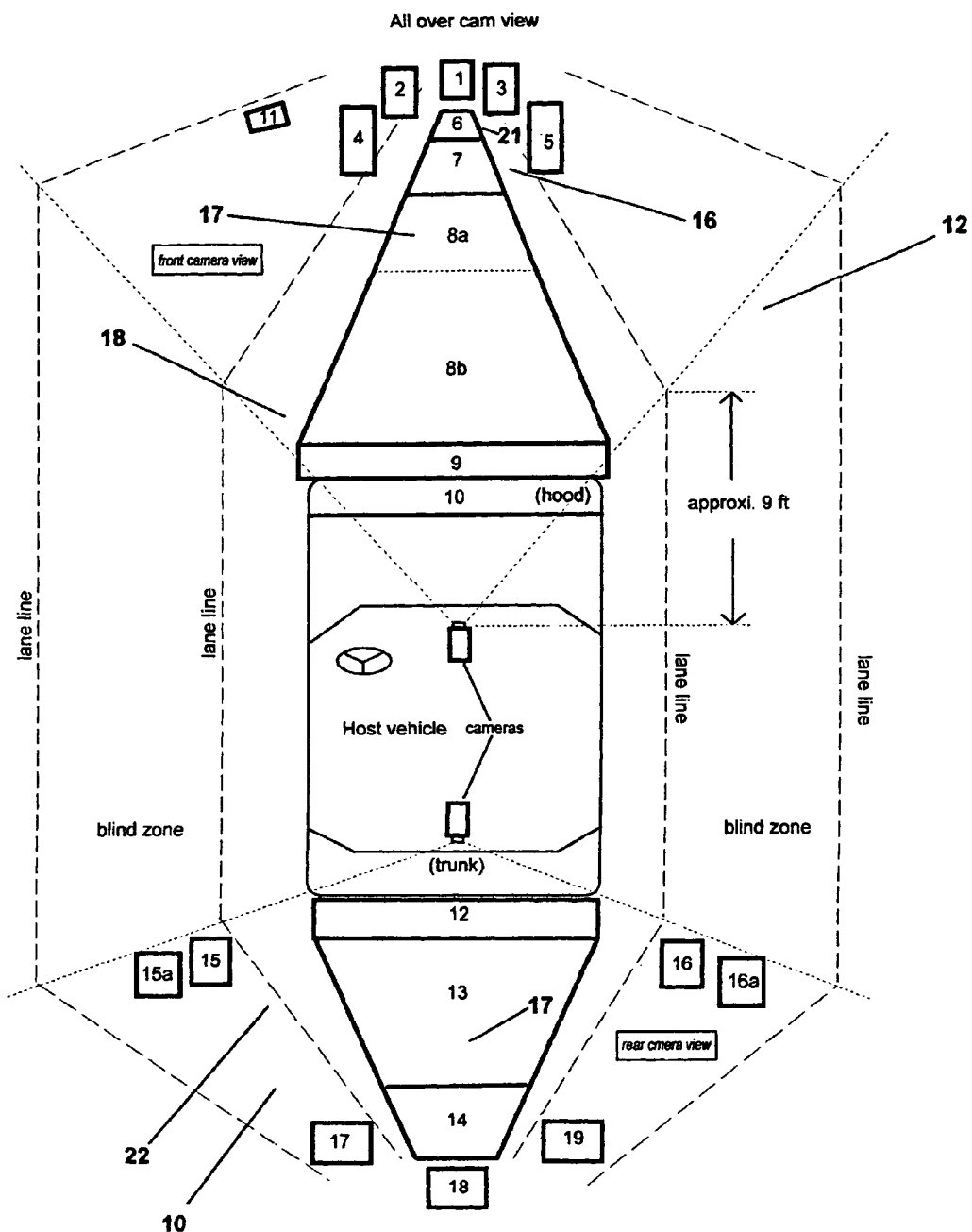
FIG. 1 depicts a representative view of a video display formed of horizontal and vertical rows of pixels with windows Overlain in defined areas of the display.

Referring now to the drawings in FIGS. 1-15, the disclosed device 10 yielding the system and method for detection and avoidance of motor vehicle collisions is depicted.

The system of the device 10 employs a first video camera facing forward of the vehicle and trained upon the road in front of the driver at all times. A live video feed from the first camera will produce a real time frontal view 12 which is a video depiction of the road in front of the driver and displayed on a video screen 14 in the resident format of the screen 14. As noted, the video feed might also be virtual wherein it is handled inside the computer.

A graphics card or circuit communicating with a computer interprets the video feed from the first camera and translates it into individual pixels and lines, which are displayed on the frontal view 12 as best shown in FIG. 1. The number of horizontal lines is known to the computer software for calculation purposes of speed and closing rates. As is the case with video cards and software for display, each pixel on the displayed screen 14 is in a known position to the computer and software relative to an x-y axis.

An overlay 18 which may or may not be depicted is ascertained by the software upon the video screen 14 and is a graphic depiction of portions of the road located in front of the vehicle and to the rear of the vehicle. This graphic depiction features a series of lines and windows which vary in dimensions. Each such window and line is located at specific points and positions on the screen 14 and the area of each and its location relative to the x-y axis is also known to the software and computer. It is preferred for driver information and comfort to display the overlay 18.

In the frontal view 12 rendering a depiction of the road and the windows in front of the vehicle are situated in a current preferred mode of the system a set of ten individual windows each having a specific shape, area, and location. In the rear view 22 are located a second set of eight window areas. All of the defined windows have a static dimension and a static location on the video screen 14.

Figure 2:
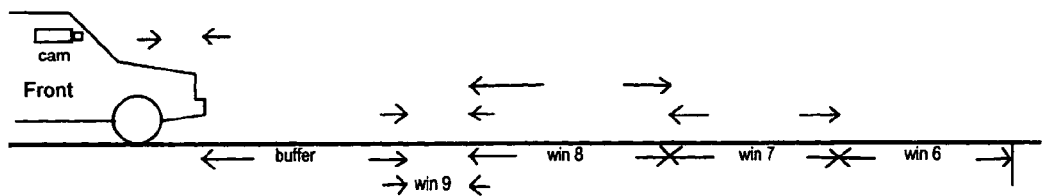
FIG. 2 depicts a calibration stage for the front facing camera wherein window boundary lines are aligned for a known distance to allow for closing rate and distance calculations by a computer from a known point.
Figure 2A:
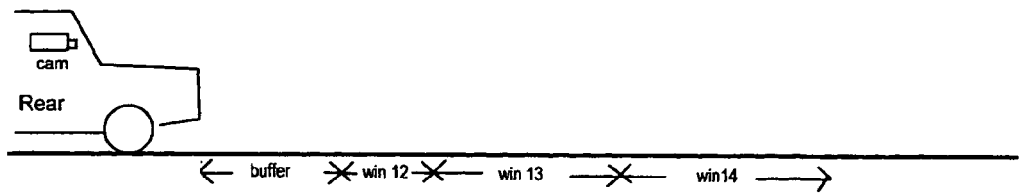
FIG. 2a depicts the calibration for the rear camera.
Figure 3:
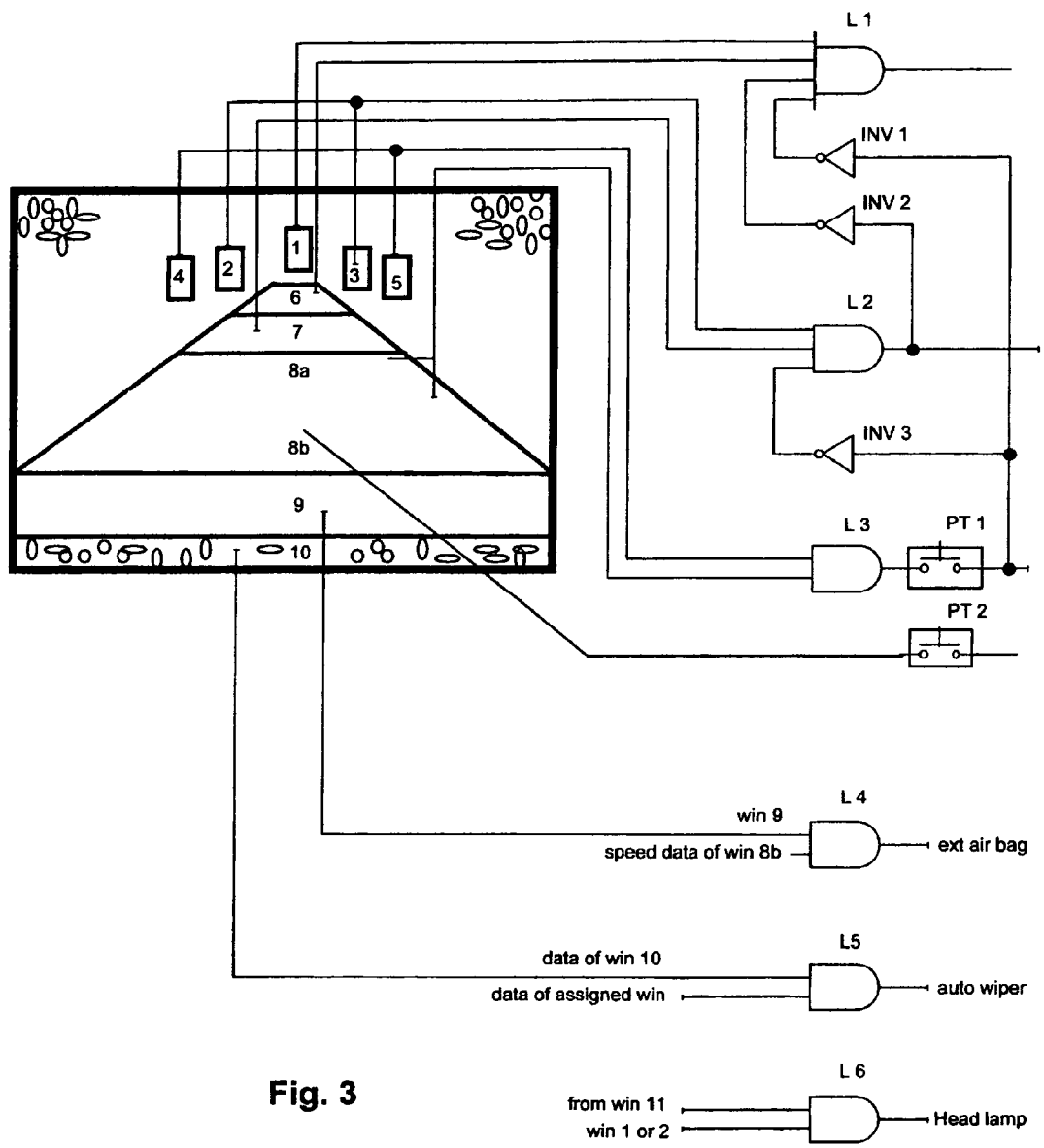
FIG. 3 is an overall block diagram graphically depicting various switching means dependent on sensed items in the various windows on the video display.
Figure 4:
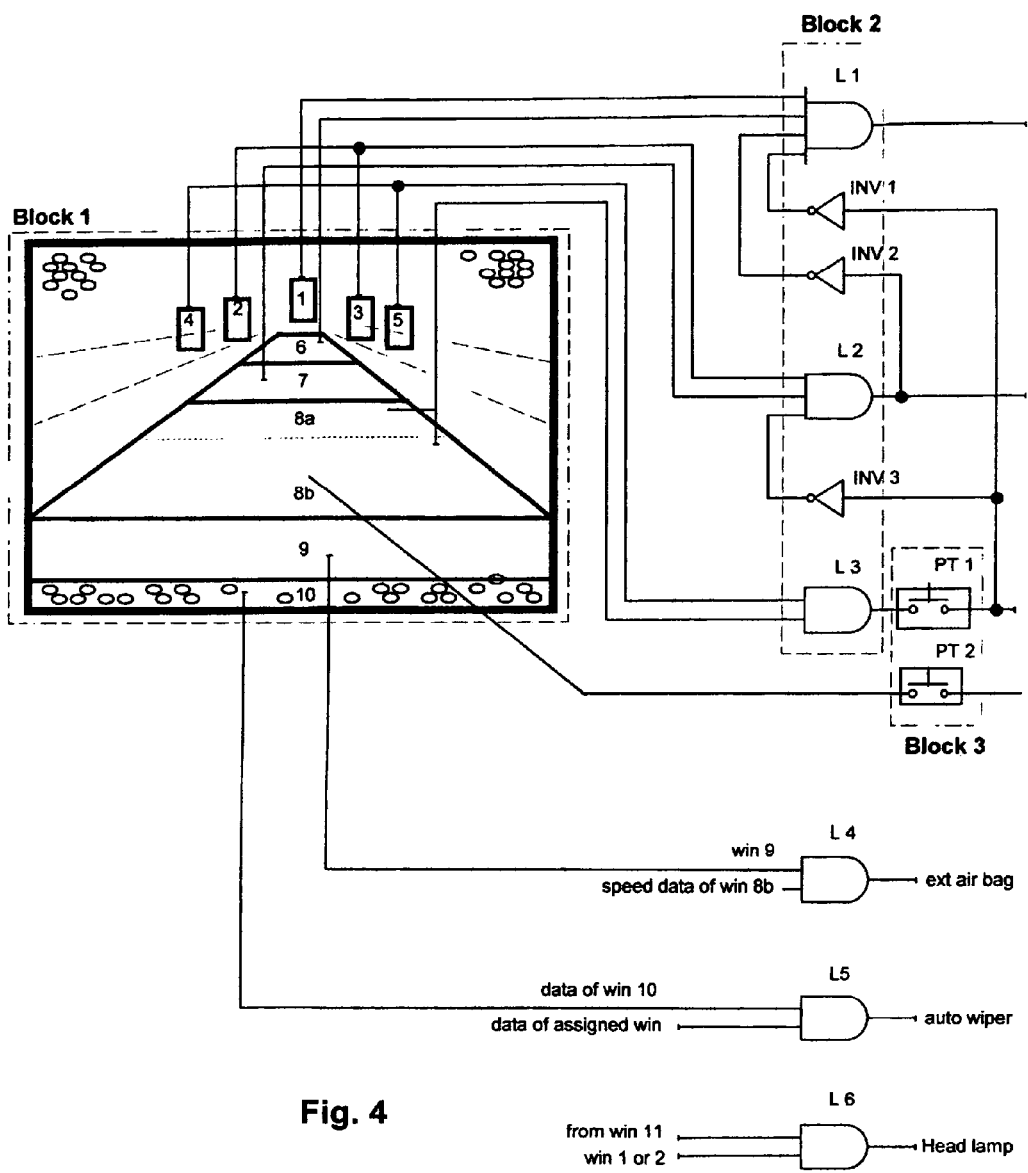
FIG. 4 depicts a second block diagram showing functions dependent on blocks of switching means which could also be handled by software switching using software written with rules adapted to the task.
Figure 5:
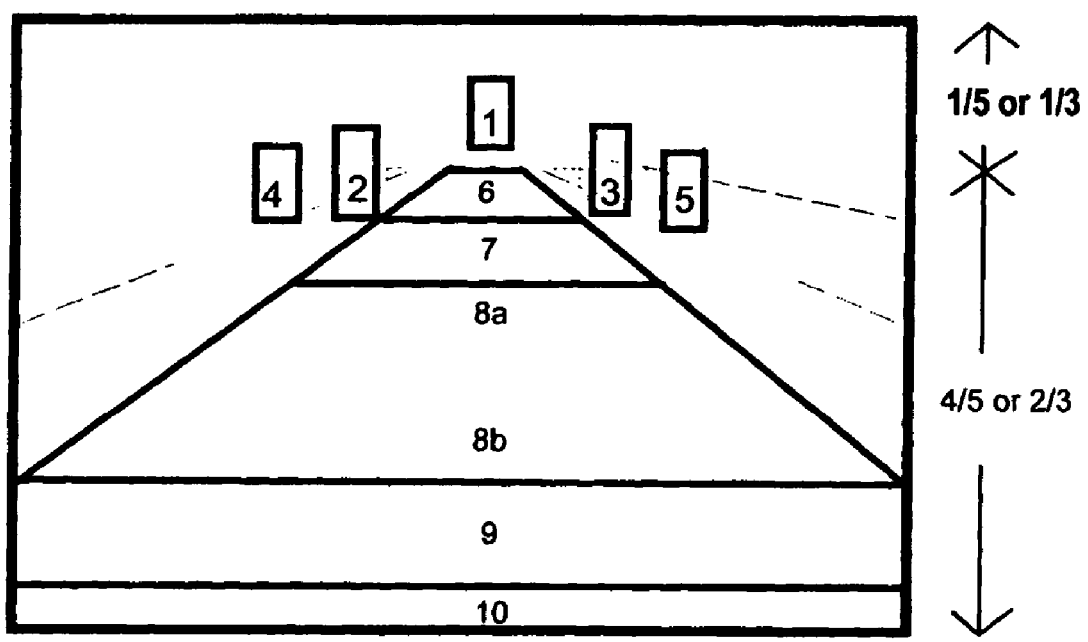
FIG. 5 depicts the typical range setting for various defined windows in the video display.

For both the frontal view 14 and rear view 22 and proper operation of the system, the cameras must be calibrated to the static windows as depicted in FIG. 2. This calibration is achieved by moving each respective camera on its mount to position a boundary line between two of the inline overlain windows, at a specific point on the video display 14.

In the frontal view 12, in a current preferred mode, there are ten individual windows overlain on the video display 14 at specific positions. At a center section aligned with the center axis X running through adjacent trapezoidal windows of the display, is window 1 which is the shortest bar centrally located in a row of five such bar type windows. Adjacent to window 1 are windows 2 and 3 on each side of window 1 which are equal but slightly longer than window 1. To the outside of windows 2 and 3 are windows 4 and 5, respectively, both of substantially equal length and thereby forming a row of parallel bar-shaped windows declining in length from the longest windows 4 and 5 toward the shortest bar at the center which is window 1.

Also on the frontal view 12, is a second series of substantially trapezoidal shapes which aligns with the lane of the road being driven. These trapezoidal windows increase in dimension from the narrowest and most distant window number 6, to the widest window number 8 which is divided into two areas. Another rectangular window number 9 is positioned to render the area directly in front of the hood of the vehicle and in-between window number 8 and the vehicle hood.

Finally, in a position on the frontal view 12 to be in an adjacent lane, an additional window is depicted which is rectangular but in an angled direction relative to the axis X. Window number 11 is depicted in a position on the frontal view 12 representative to a lane for oncoming traffic.

In the rear view 22, the second set of windows is graphically overlain on the display 14 depicting the area to the rear of the car. The rear set of windows includes two inline trapezoidal windows 13 and 14 and a small rectangular window number 12 representing the area of the road directly behind the trunk and sandwiched between trapezoidal window 13.

Additionally included in the second set of windows in the rear view 22, are three bar-shaped windows 6-8 numbered as 17, 17b, 18, and 19, each having a center axis parallel to each other and parallel with the center axis X of both the front and rear inline trapezoidal windows. The center axis of window 18 is inline with the center axis X. Two rectangular windows 15 and 16, are positioned adjacent to the trapezoidal windows 13-14 at angles to the axis X.

As noted, and shown in FIG. 2, prior to the initial use, the system is calibrated to take into consideration a known distance upon which all the other windows in the system relate. Currently, the user or factory would adjust the camera angle looking forward, to position the boundary 21 between adjoining windows 6 and 7, to substantially 45 feet in front of the boundary for the front of the vehicle the lower portion of window 9. Once calibrated, all the static windows displayed on the video display 14 using software in a communicating computer will be employed to calculate threat levels, warnings, and evasive actions, based on a real time constant review of the status of the pixels inside each respective window and the known distance to the boundary 21.

In use, as the device equipped vehicle moves down the road, the pixels inside each depicted window will incur an illumination change as new objects come into view of the front camera. This illumination change and the interrelation of changed objects occupying sections of pairs of windows provides a means for the software to ascertain a threat of collision and to warn or take a calculated counter measure if the warning is not heeded.

Figure 6:
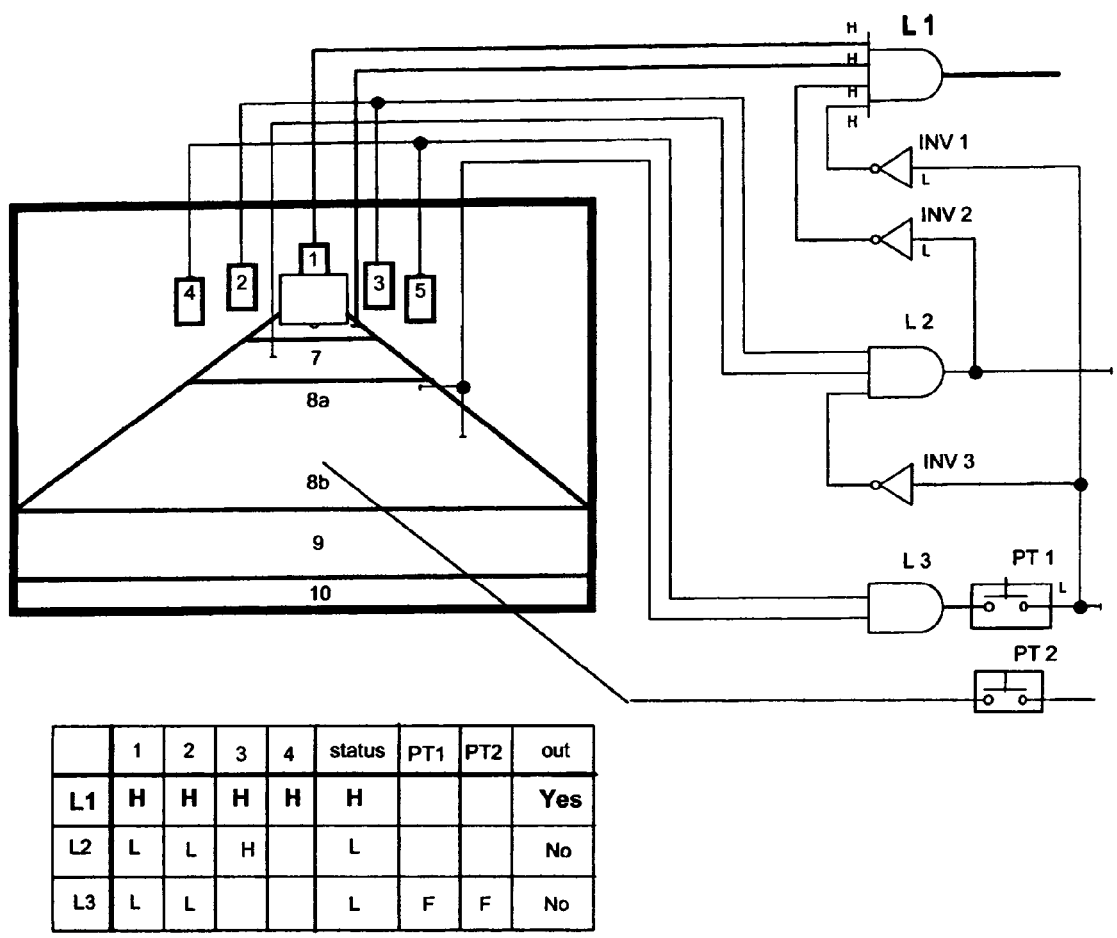
FIG. 6 shows an exemplar of operation of the device where a vehicle or object sensed as present in window 6 of the display.

In the frontal view 12 and outlined for computer-initiated actions in FIGS. 3-11, the computer will ascertain a location of another vehicle on the road, by calculating pixel changes inside specific pairs or pluralities of the windows defined in the video display. As shown in FIG. 6, the silhouette of a vehicle positioned within window 6, is seen by the software as a vehicle traveling in front of the user's vehicle at a safe distance depending on relative speeds since it is beyond the boundary line 21. As long as the vehicle silhouette remains in window 6 and does not cross the boundary line 21 and intersect other windows of the display, the computer will memorize the speed of the vehicle and monitor the speed and closing rate of the vehicle observed as depicted in FIG. 6.

Important in the system is the fact that as a vehicle being monitored in front of the user gets closer, its silhouette enlarges in all directions around the center point of the silhouette. Consequently, the silhouette, once the tracked vehicle becomes closer, will become larger and intersect with at least two windows to cause an action by the computer monitoring it.

Figure 7:
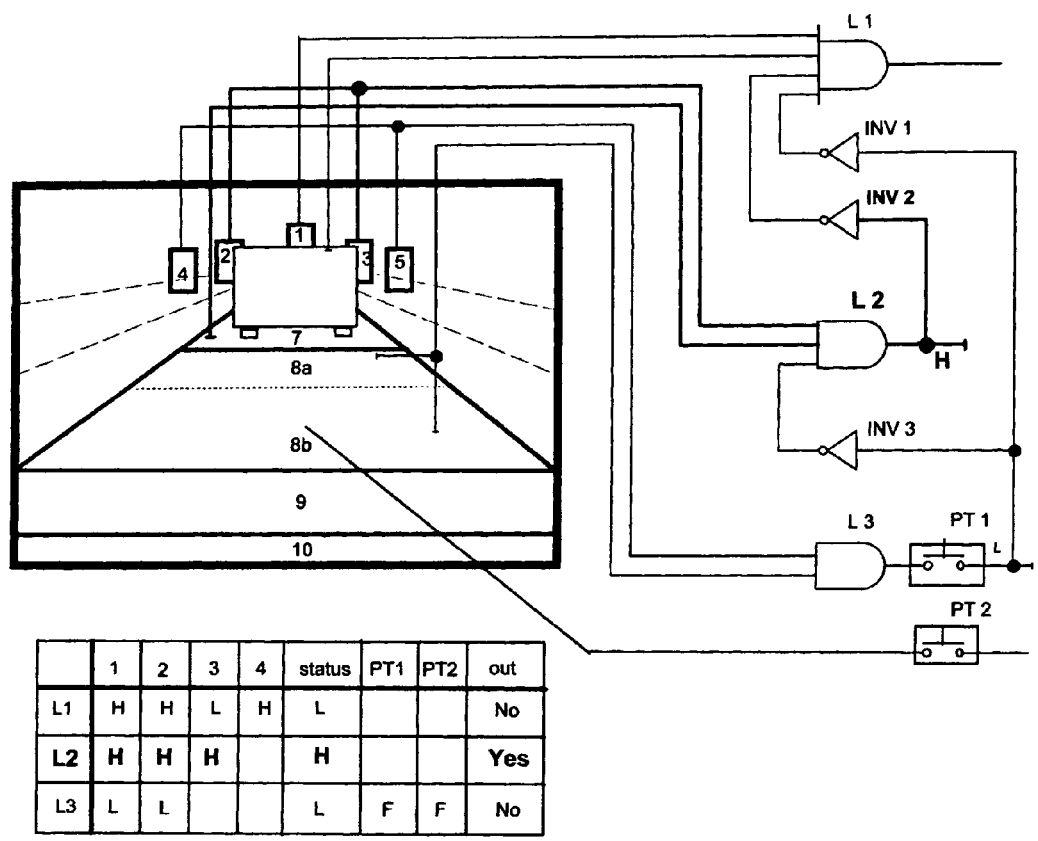
FIG. 7 depicts operation of the device where a single vehicle or object sensed as present in window 6 of the display.
Figure 8:
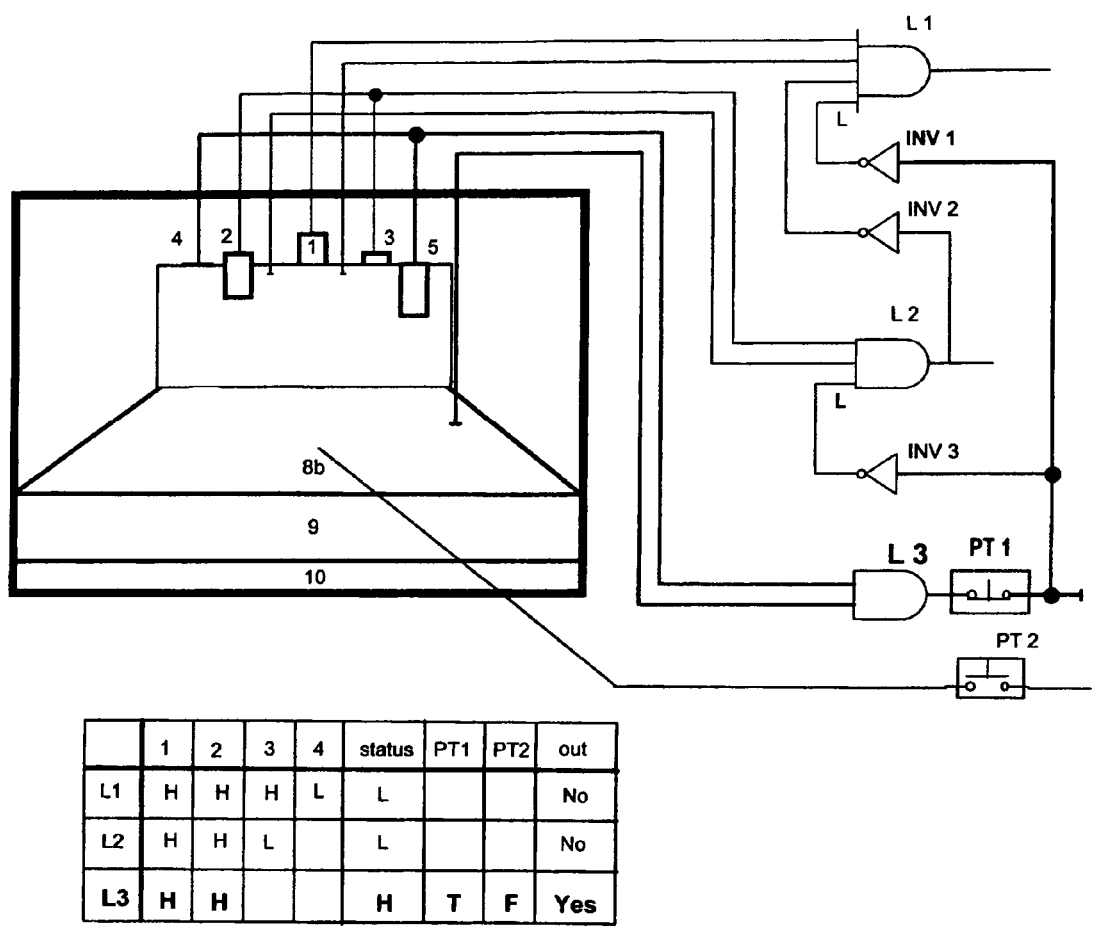
FIG. 8 shows operation of the device when an object moves into window 8.
Figure 9:
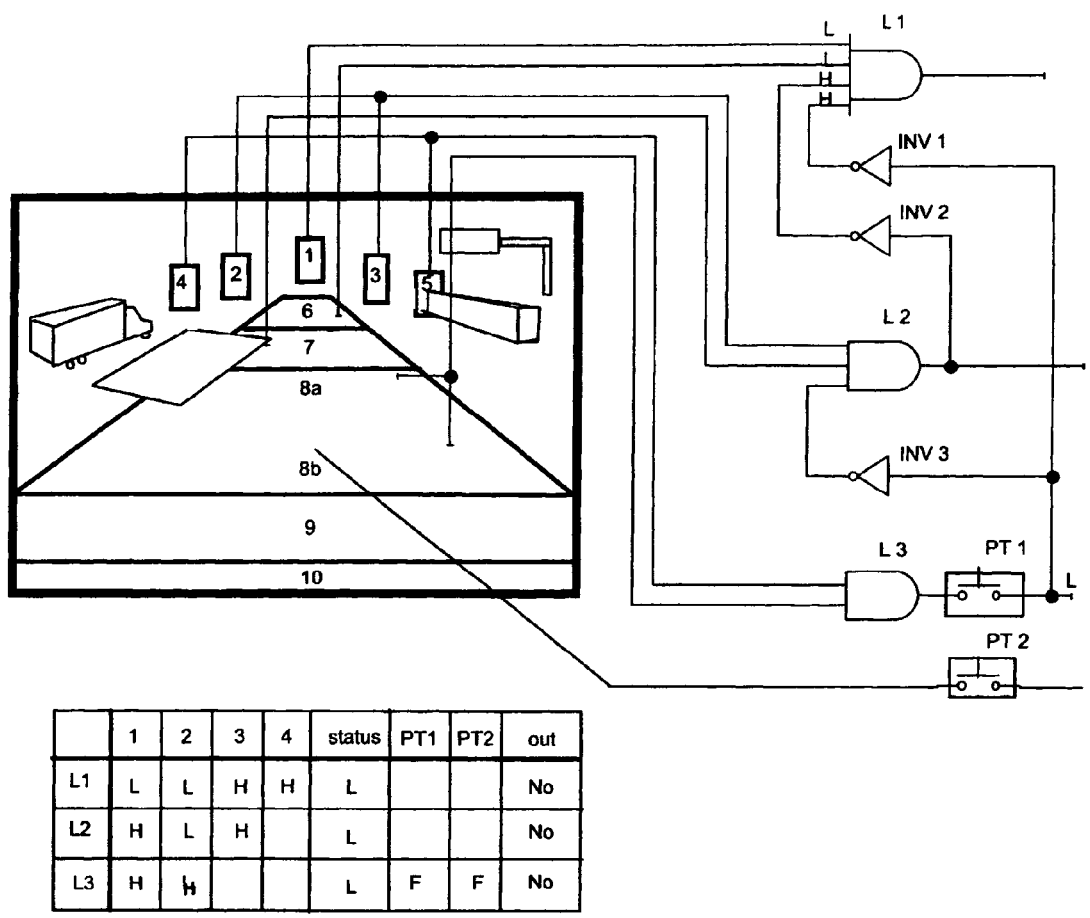
FIG. 9 depicts operation of the device employing switching as a means to ignore the presence of shadows in the screen windows.
Figure 10:
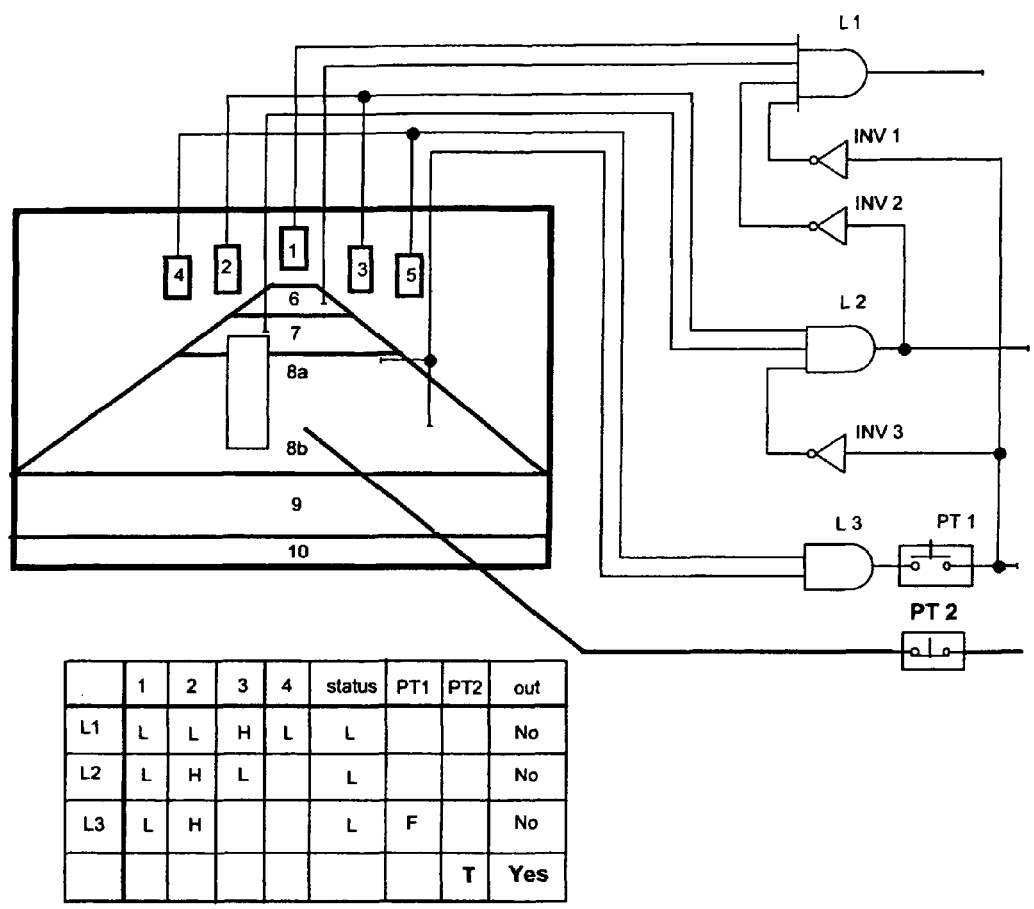
FIG. 10 shows a mode of the device wherein a lookup table of images is employed to ascertain the presence of a person in the roadway.

As it gets closer the silhouette will fill more area of the display which is illustrated in FIGS. 7-8. A vehicle silhouette which fills any portion of window 2 or 3 in combination with any area of window 7, as shown in FIG. 7, will be seen as a vehicle that is much closer to the user's vehicle than a vehicle that simply fills a portion of window 6 and does not cross the boundary line 21. As noted, the system can be software driven using known pixel locations and logical associations for software based switching actions similar to the hard wired switching shown in the various logic tables and graphic circuit depictions in the figures. As shown in FIGS. 3-4 and 6-11, the system can employ electronic circuits where a voltage is initiated by electronic switching using software when windows are discerned as having objects within them resulting in a signaling to the computer and/or other electronic devices onboard as to an action.

For example, as shown in FIG. 8, an object covering windows 6 and 7 and part of window 8, and covering at least one of windows 4 and 5, will generate a voltage which disables L1 and L2 and activates L3. As noted, and shown in FIGS. 9-11, false alarms from simple shadows which might appear in window 7 or 8 or 9, are ignored and filtered by the system since the shadow lacking mass and height will not appear in any of windows 1-5. Of course those skilled in the art will realize that other circuits can be formed to accomplish the task, or in the particularly preferred mode, software-based switching can be employed to accomplish all of the various switching tasks noted in the specification and to determine which of the windows of the display are discerned to have an object covering all or part of them.

In a third representative mode of recognition depicted in FIG. 8, a vehicle silhouette which darkens or changes the projection of light from the pixels inside at least windows 4 or 5 in combination with a first portion window 8, is interpreted by the computer as a vehicle that is very close to the user's vehicle. As noted earlier, it is this requirement for a pairing of objects or silhouettes in the windows that provides means to discern the difference between a shadow or street sign and an actual vehicle. Using the software and logic tables, or hardware to form switching circuits shown in figures, in order for a change in window pixel depictions to be identified as a vehicle, a change in the shade both window 7 and either FIG. 2 or 3 must occur, or in window 8 combined with one of windows 4 or 5. A shadow, or street sign appearing in FIG. 7 which does not shade the other FIG. 2 or 3, will thus will be ignored by the system and not considered an object or potential threat.

Threat assessment by the computer takes into consideration the relative location of the vehicle or vehicles ascertained in the windows, the closing rate between the user's vehicle and the sensed vehicle from the software discerned pixel changes in the respective windows, to issue a visual or sonic warning of upcoming vehicle. The closing rate can be calculated by using the known distance of the boundary line 21 between windows 6 and 7 from the earlier noted calibration, and the duration of time it takes for the targeted vehicle in the windows to move across the horizontal lines of the video display 14, combined with the known speed of the user's vehicle as noted above.

Should this closing rate be calculated as dangerous and a possible collision threat, the computer may warn the driver using the output from wired or electronic switching to initiate a visual or audible alarm, or may activate a solenoid or switch to tap the brakes or cease acceleration.

Further, in a particularly preferred mode of the device, the computer is programmed to be able to calculate that a collision is unavoidable, either from the front or the rear of the user's vehicle, using closing rate calculations as the objects intersect and cross through the aforementioned windows.

Figure 14:
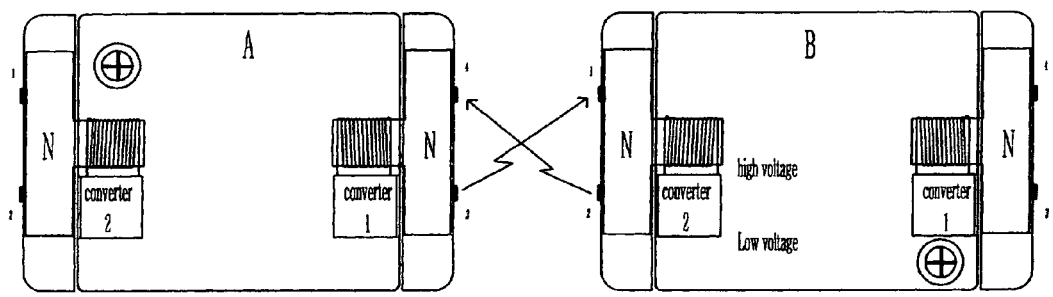
FIG. 14 depicts a collision avoidance or minimization system that may be activated by the device to damper or eliminate physical impacts.

As shown in FIG. 14, a means to prevent or dampen impact between the two vehicles may be activated. A first such means for dampening collision impact can be provided in combination with the first, or separately in the form of an electromagnetic bumper 54 system shown in FIG. 15. This system would require that both vehicles have such magnetic repelling devices on their exterior. In this means for dampening impact, the controlling vehicle which is the vehicle with the device 10 determining an imminent collision threat will broadcast a signal to the other vehicle to activate its electromagnet bumper to yield a north or south magnetic field. The controlling vehicle would concurrently activate its own electro magnetic bumper 54 with the same north field polarity as noted in FIG. 15. Prior to any collision, the impact will be dampened or avoided by the two counteracting magnetic fields of their respective bumpers 54 and energy which might cause injury would be used during the magnetic fields repelling each other. Of course other means for dampening impact as would occur to those in the art can be employed and are anticipated. As depicted in FIG. 15, the means to avoid or dampen impact would be magnetic field generators in both vehicles which would generate similar field properties which repel each other. This can be done through a wireless communication between the computers on both vehicles to energize the field producing components. The magnetic fields so generated at the front or rear of the user's vehicle and other vehicle can be activated by the computers in the respective vehicles just prior to a calculated impact. This would have the effect of shielding both vehicles from harm.

Another means for dampening a collision impact would be the provision of exterior airbags engaged to the front or rear of the user's vehicle in a bumper-like position. In the undeployed state, the airbags can take the shape of a conventional car bumper and operate as such when not deployed. In case collision mitigation is determined as required, the computer, just prior to the impact, will deploy an airbag on the front or rear of the vehicle in the direction of the oncoming threat.

Figure 13:
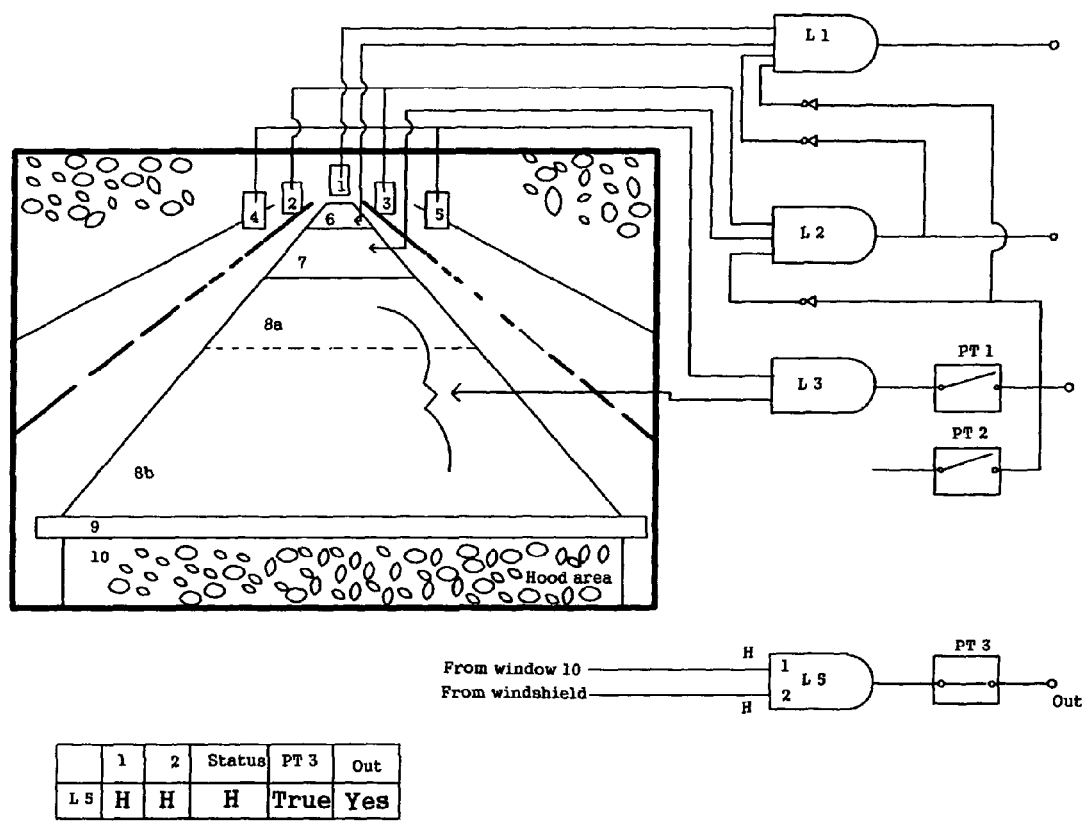
FIG. 13 depicts the device wherein the appearance of rain in on the screen is recognized by stored image data thereby powering up the wipers.

In other actions by the device 10 using the real time video and continuously calculating the relative locations of objects in front and to the rear of the vehicle, the device 10 can operate other components of the vehicle for the driver. In a first such operation, the appearance of raindrops in the video display inside window 10 which monitors the vehicle hood and/or windshield, as shown in FIG. 13, can cause the computer to activate the window wipers on a rainy day.

Using the known distances of the windows and objects ascertained within them, the device 10 provides a means for an adaptive cruise control to thereby maintain the vehicle to the front, at a determined distance. The monitoring vehicle using the device 10, will maintain a constant distance behind a leading vehicle by operating the accelerator and/or brakes to slow down and speed up and keep the discerned object in the appropriate position in the different windows of the screen using that position to increase or decrease acceleration and maintain it. The task of headlight activation and dimming as shown in the switching circuit of FIG. 3, can also be taken over by the device 10 using the ascertained light levels received into the lens of the front facing video camera and the ascertained positions of oncoming vehicle headlights in the windows on the video display.

Additionally the device 10 can be employed as a supplement road display to the driver. This is done by using software to place virtual icons representing vehicles on the video screen around the user's vehicle on the screen. As shown in FIGS. 15-15b, should a vehicle be sensed at window 16 when the user signals for a lane change to the right, a warning not to change lanes can be placed on the screen or on the dashboard display shown in FIGS. 15a-15b and colorized or caused to blink or otherwise signal the presence of a vehicle. The same would be true of a lane change to the left and window 15.

The rear view 22 of the video display 14 operates in a similar fashion to the frontal view 12. In the rear view 22, the computer will be monitoring the illumination state of pixels in the defined windows to ascertain if an approaching vehicle is causing a dangerous situation. Should the computer sense that such is unavoidable by the appearance of an object in windows 14 or 13, once the object reaches window 12, impact mitigation actions would be taken much like that of the front view. In such a case, any of the noted mitigation would be initialed such as the magnetic repulsion or the exterior airbag bumper.

Figure 11:
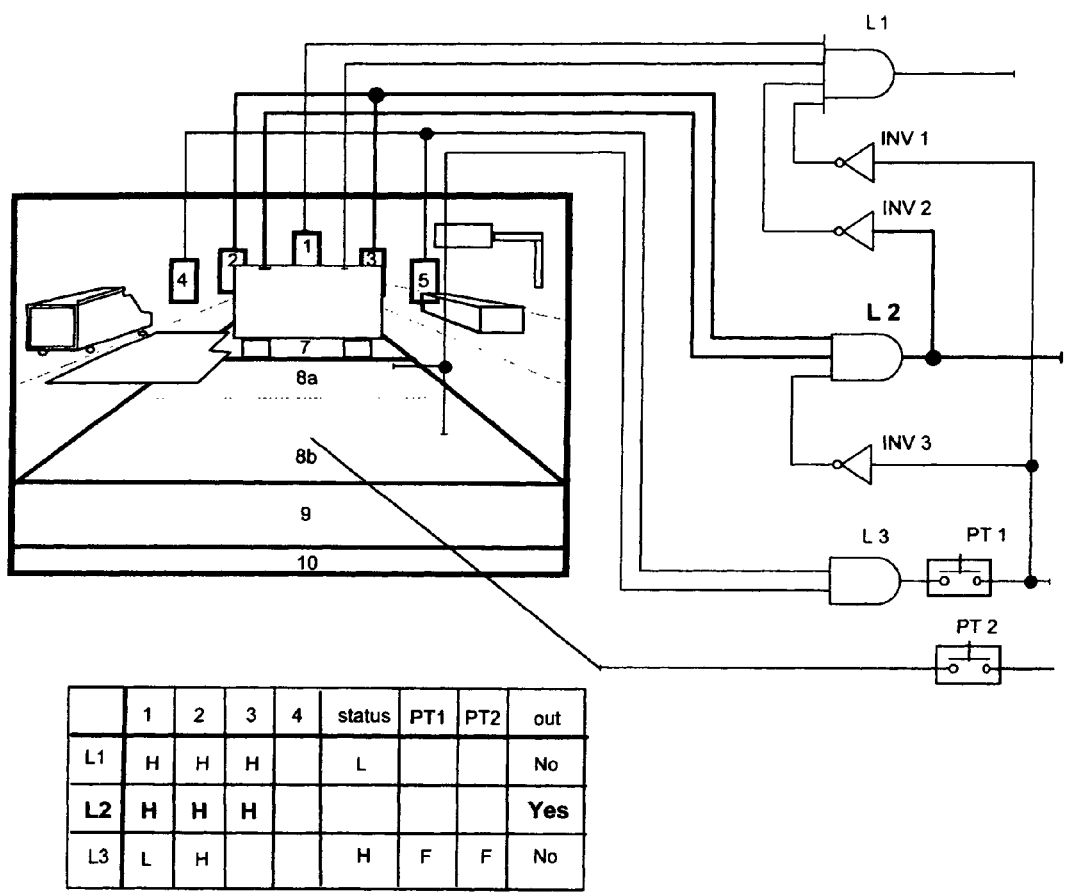
FIG. 11 shows the disclosed device employing switching means to determine a combination of shadows and an object in the roadway.
Figure 12:
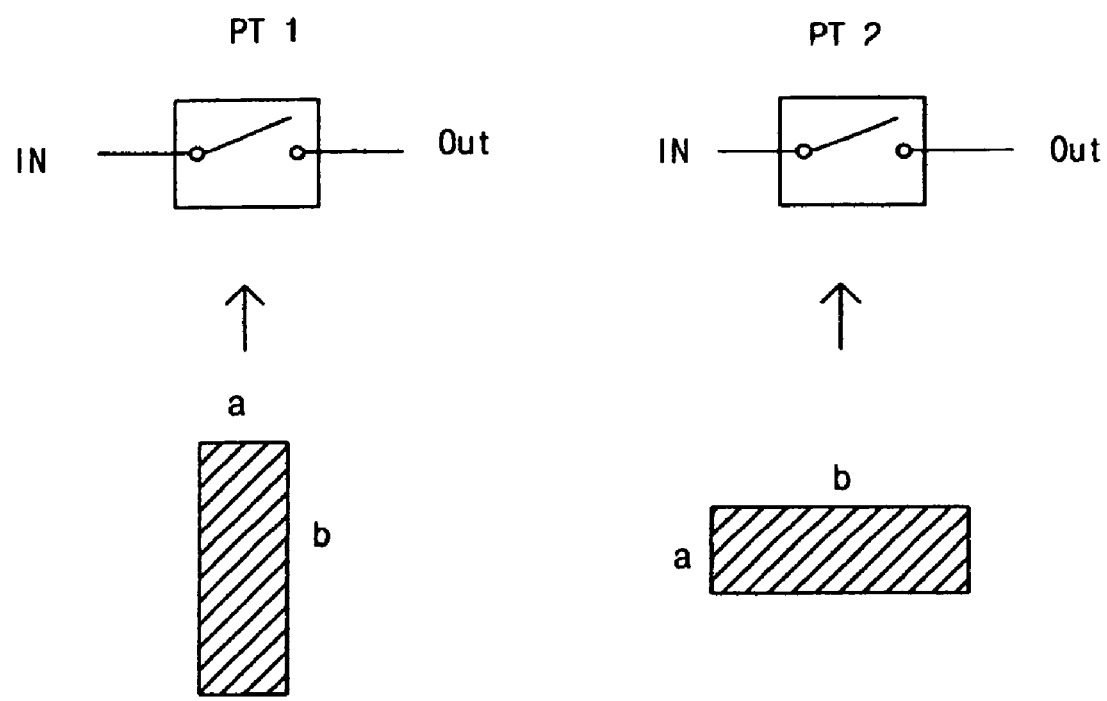
FIG. 12 depicts a mode of the device employing stored images to identify the presence of either a person or a vehicle.

Finally, with the employment of video cameras and computers, the system can be used to discern if an object is a person or a vehicle or other solid object. In FIG. 11 and shown in FIG. 12 there is a pattern recognition routine that again may be handled by software switching or hardwired software controlled circuits shown in FIG. 11. Employing circuits, PT2 and PT2 would be switched depending on the recognized pattern by the computer from the video image. In this mode of operation, the object sensed in the windows of the video screen may be discerned using stored video patterns in the computer as a lookup table for silhouettes of vehicles having a generally horizontal elongation and humans that have a generally vertical elongation. If a human is recognized by the elongated generally vertical pattern, PT1 would be activated. If the horizontal figure is discerned, then PT2 would be closed and activated.

It is to be understood that elements of different construction and configuration and different steps and process procedures and other arrangements thereof, other than those illustrated and described, may be employed for providing the collision avoidance and mitigation system and any method herein within the spirit of this invention.

As such, while the present invention has been described herein with reference to particular embodiments thereof, a latitude of modifications, various changes and substitutions are intended in the foregoing disclosure, and it will be appreciated that in some instance some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. An apparatus for vehicle collision avoidance and mitigation on a roadway comprising:
    a video camera providing a frontal view of a roadway in front of said vehicle;
    a video display communicating with said video camera and depicting said frontal view through illumination of pixels of said video display;
    an upper horizontal edge of said frontal view on said video display;
    a vertical line on said display representing a center axis extending toward said upper edge;
    a first horizontal line on said display representing the front edge of said vehicle;
    a second horizontal line on said display parallel to said first horizontal line and spaced a distance from said first horizontal line;
    an area of said pixels between said second horizontal line and said first horizontal line defining a first window of said display;
    a pair of angled lines positioned equidistant from said vertical line defining angled sides, said pair of lines intersecting ends of said second horizontal line and extending toward said upper horizontal edge angling inward toward said center axis;
    a third horizontal line parallel to said second horizontal line extending between said angled sides, said third horizontal line positioned between said upper horizontal line and said second horizontal line;
    an area of said pixels between said angled sides, said third horizontal line and said second horizontal line defining a second window of said display;
    a fourth horizontal line parallel to said third horizontal line extending between said angled sides positioned between said upper horizontal line and said third horizontal line;
    an area of said pixels between said angled sides, said third horizontal line and said second horizontal line defining a third window of said display;
    a fifth horizontal line parallel to said fourth horizontal line extending between said angled sides positioned between said upper horizontal line and said fourth horizontal line;
    an area of said pixels between said angled sides, said fifth horizontal line and said fourth horizontal line defining a fourth window of said display;
    a fifth window having four sides surrounding an area of said pixels on said display extending a first distance along and aligned with, said center axis, from said upper edge toward said fifth horizontal line;
    a sixth window having four sides surrounding an area of said pixels on said display extending a second distance from said upper edge, said sixth window being parallel to said fifth window and having a first separation distance from said center axis;
    a seventh window having four sides surrounding an area of said pixels extending said second distance from said upper edge on an opposite side of said center axis from said sixth window and spaced said first separation distance from said center axis;
    an eighth window having four sides surrounding an area of said pixels extending a third distance from said upper edge and spaced a second separation distance from said center axis, said second separation distance being larger than said first separation distance;
    a ninth window having four sides surrounding an area of said pixels extending said third distance from said upper edge and spaced said second separation distance from said center axis;
    said third horizontal line calibrated to depict a position on said roadway, said position being a known distance from said first horizontal line;
    means to monitor an illumination state of each of said pixels occupying each of said respective windows and to communicate changes in said illumination state in any of said windows in a data communication to a computer;
    software in said computer adapted to calculate the presence of an object in any of said windows based on said data communicating;
    said software adapted to ascertain a closing rate of distance between said vehicle and said object based movement of said object on said display toward and away from said third horizontal line;
    means to ascertain the difference between a shadow and a said object causing said change in said illumination of said pixels in each of said windows;
    said means to ascertain the difference between a shadow and a said object provided by a filter, said filter requiring that for said illumination state of said third window to indicate a presence of a said object therein, there must also be a concurrent said illumination state of either of said sixth or seventh windows, and for said illumination state of said second window to indicate a presence of a said object therein, there must also be concurrent said illumination state of said pixels of ether of said eighth or said ninth windows, whereby said objects detected can be tracked and a potential collision with said object can be predicted using said closing rate and one or a plurality of evasive actions can be initiated by said software running on said computer.

2. The apparatus for vehicle collision avoidance and mitigation of claim 1 additionally comprising:
    said software providing an adaptive cruise control maintaining a said object a fixed distance from said vehicle by controlling acceleration of said vehicle.

3. The apparatus for vehicle collision avoidance and mitigation of claim 1 additionally comprising:
    said software adapted to initiate one or a plurality of actions from a group of actions including a visual alarm, an audible alarm, initiating braking of said vehicle, initiating means for collision dampening.

4. The apparatus for vehicle collision avoidance and mitigation of claim 2 additionally comprising:
    said software adapted to initiate one or a plurality of actions from a group of actions including a visual alarm, an audible alarm, initiating braking of said vehicle, initiating means for collision dampening.

5. The apparatus for vehicle collision avoidance and mitigation of claim 3 wherein said means for collision dampening is one or a combination of collision dampening components from a group consisting of vehicle bumpers generating a magnetic field the same as a second magnetic field on a second vehicle, and inflating airbags portioned at vehicle bumper locations.

6. The apparatus for vehicle collision avoidance and mitigation of claim 4 wherein said means for collision dampening is one or a combination of collision dampening components from a group consisting of vehicle bumpers generating a magnetic field the same as a second magnetic field on a second vehicle, and inflating airbags portioned at vehicle bumper locations.

7. The apparatus for vehicle collision avoidance and mitigation of claim 1 additionally comprising:
    said software adapted to recognize objects or lighting conditions rendered of said roadway by said pixels;

said software ascertaining the presence of raindrops and activating windshield wipers on said vehicle; and said software ascertaining low light conditions on said roadway and activating headlights on said vehicle.

8. The apparatus for vehicle collision avoidance and mitigation of claim 2 additionally comprising:

said software adapted to recognize objects or lighting conditions rendered of said roadway by said pixels;

said software ascertaining the presence of raindrops and activating windshield wipers on said vehicle; and said software ascertaining low light conditions on said roadway and activating headlights on said vehicle.

9. The apparatus for vehicle collision avoidance and mitigation of claim 3 additionally comprising:

said software adapted to recognize objects or lighting conditions rendered of said roadway by said pixels;

said software ascertaining the presence of raindrops and activating windshield wipers on said vehicle; and said software ascertaining low light conditions on said roadway and activating headlights on said vehicle.

10. The apparatus for vehicle collision avoidance and mitigation of claim 5 additionally comprising:

said software adapted to recognize objects or lighting conditions rendered of said roadway by said pixels;

said software ascertaining the presence of raindrops and activating windshield wipers on said vehicle; and said software ascertaining low light conditions on said roadway and activating headlights on said vehicle.

11. The apparatus for vehicle collision avoidance and mitigation of claim 6 additionally comprising:

said software adapted to recognize objects or lighting conditions rendered of said roadway by said pixels;

said software ascertaining the presence of raindrops and activating windshield wipers on said vehicle; and said software ascertaining low light conditions on said roadway and activating headlights on said vehicle.

12. The apparatus for vehicle collision avoidance and mitigation of claim 1 additionally comprising:

means for monitoring said roadway rearward of said vehicle said means for monitoring said roadway having:

a second video camera communicating a rearward view of a roadway to second portion of said video display through illumination of said pixels of said video display;

a lower horizontal edge of said rearward view;

said center axis extending toward said lower horizontal edge;

a first rearward horizontal line on said display representing a rear edge of said vehicle;

a second rearward horizontal line on said display parallel to said first rearward horizontal line and spaced a distance therefrom;

an area of said pixels between said second rearward horizontal line and said first rearward horizontal line defining a first rear window of said display;

a rearward pair of angled lines positioned equidistant from said center axis defining rearward angled sides, said rearward pair of lines intersecting ends of said second rearward horizontal line and extending toward said lower horizontal edge angling inward toward said center axis;

a third rearward horizontal line parallel to said second rearward horizontal line extending between said angled sides, said third rearward horizontal line positioned between said lower horizontal edge and said second rearward horizontal line;

an area of said pixels between said rearward angled sides, said third rearward horizontal line and said second rearward horizontal line defining a second rearward window of said display;

a fourth rearward horizontal line parallel to said third rearward horizontal line extending between said rearward angled sides positioned between said lower horizontal edge and said third rearward horizontal line;

an area of said pixels between said rearward angled sides, said third rearward horizontal line and said second rearward horizontal line defining a third rearward window of said display;

a fifth rearward window having four sides surrounding an area of said pixels on said display extending a first distance along and aligned with, said center axis, from said lower edge toward said fourth rearward horizontal line;

means to monitor an illumination state of each of said pixels occupying each of said respective rearward windows and to communicate changes in said illumination state in any of said rearward windows in a rearward data communication to said computer;

said software in said computer adapted to calculate the presence of a rearward object in any of said rearward windows based on said rearward data communicating;

said software adapted to ascertain a rearward closing rate of distance between said vehicle and said rearward object based movement of said rearward object on said display toward and away from said third horizontal line; and said software adapted to initiate rearward collision mitigation actions when a collision with said rearward object is calculated.

13. The apparatus for vehicle collision avoidance and mitigation of claim 12 additionally comprising:

said software adapted to initiate one or a plurality of actions from a group of actions for said rearward collision mitigation including a visual alarm, an audible alarm, initiating braking of said vehicle, initiating means for collision dampening; and releasing the brakes for a short duration as said rearward object enters said first rearward window.

14. A method for vehicle collision avoidance and mitigation employing a video camera communicating a frontal view of a roadway in front of a vehicle to a video display comprising the steps of:

depicting said frontal view on said video display between an upper horizontal edge and a lower horizontal edge;

defining a vertical line on said display representing a center axis of said video display;

defining a first horizontal line on said display representing the front edge of said vehicle;

defining a second horizontal line on said display parallel to said first horizontal line and spaced a distance from said first horizontal line;

defining a first window on said display as an area of said pixels between said second horizontal line and said first horizontal line;

defining a pair of angled lines positioned equidistant from said vertical line, said pair of lines intersecting ends of said second horizontal line and extending toward said upper horizontal edge at an angle inward toward said center axis;

defining a third horizontal line parallel to said second horizontal line extending between said angled sides, wherein said third horizontal line is positioned between said upper horizontal line and said second horizontal line;

defining an area of said pixels between said angled sides, said third horizontal line and said second horizontal line as a second window of said display;

defining a fourth horizontal line parallel to said third horizontal line and extending between said angled sides positioned between said upper horizontal line and said third horizontal line;

defining an area of said pixels between said angled sides, said third horizontal line and said second horizontal line as third window of said display;

defining a fifth horizontal line parallel to said fourth horizontal line extending between said angled sides and positioned between said upper horizontal line and said fourth horizontal line;

defining an area of said pixels between said angled sides, said fifth horizontal line and said fourth horizontal line as a fourth window of said display;

defining a fifth window of said display having four sides surrounding an area of said pixels on said display and extending a first distance along said center axis from said upper edge toward said fifth horizontal line;

defining a sixth window of said display having four sides surrounding an area of said pixels on said display which extends a second distance from said upper edge, said seventh sixty being parallel to said fifth window and having a first separation distance from said center axis;

defining a seventh window of said display having four sides surrounding an area of said pixels extending said second distance from said upper edge upon an opposite side of said center axis from said sixth window and spaced said first separation distance from said center axis;

defining an eighth window of said display having four sides surrounding an area of said pixels extending a third distance from said upper edge and spaced a second separation distance from said center axis, said second separation distance being larger than said first separation distance;

defining a ninth window of said display having four sides surrounding an area of said pixels extending said third distance from said upper edge and spaced said second separation distance from said center axis;

calibrating said third horizontal line with a position on said roadway which is a known distance from said first horizontal line;

employing means to monitor an illumination state of each of said pixels occupying each of said respective windows to communicate changes in an illumination state in any of said windows and to communicate all said changes in a data communication to a computer;

employing software in said computer adapted to calculate the presence of an object in any of said windows based on said data communicating;

adapting said software to ascertain a closing rate of distance between said vehicle and a said object based movement of said object on said display toward and away from said third horizontal line;

adapting said software to ascertain the difference between a shadow and a said object which causes changes in said illumination of said pixels in each of said windows by employing rules wherein a said illumination state of said third window to indicate a presence of a said object therein must also have a concurrent said illumination state of either of said sixth or seventh windows, and where a said illumination state of said second window to indicate a presence of a said object therein, there must also have a concurrent said illumination state of said pixels of ether of said eighth or said ninth windows, whereby said objects detected can be tracked and a potential collision with any said object can be predicted using said closing rate and one or a plurality of evasive actions can be initiated by said software running on said computer

* * * * *